(12) United States Patent
Simon et al.

(10) Patent No.: US 11,402,536 B2
(45) Date of Patent: *Aug. 2, 2022

(54) HIGH-VOLTAGE PROTECTION AND SHIELDING WITHIN DOWNHOLE TOOLS

(71) Applicant: Schlumberger Technology Corporation, Sugar Land, TX (US)

(72) Inventors: Matthieu Simon, Clamart (FR); Jani Reijonen, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,344

(22) Filed: Jul. 17, 2020

(65) Prior Publication Data

US 2020/0348441 A1    Nov. 5, 2020

Related U.S. Application Data

(63) Continuation of application No. 16/203,867, filed on Nov. 29, 2018, now Pat. No. 10,718,880.

(51) Int. Cl.
| | |
|---|---|
| *G01V 5/08* | (2006.01) |
| *E21B 41/00* | (2006.01) |
| *H05H 5/06* | (2006.01) |
| *H05H 5/04* | (2006.01) |
| *E21B 47/017* | (2012.01) |
| *E21B 49/00* | (2006.01) |

(52) U.S. Cl.
CPC ............ *G01V 5/08* (2013.01); *E21B 41/0085* (2013.01); *E21B 47/017* (2020.05); *H05H 5/04* (2013.01); *H05H 5/06* (2013.01); *E21B 49/00* (2013.01)

(58) Field of Classification Search
CPC ... G01V 5/10; G01V 5/12; H05H 5/05; H05H 5/06; E21B 47/011; E21B 49/00; E21B 41/0085

See application file for complete search history.

(56) References Cited

U.S. PATENT DOCUMENTS

| | | | |
|---|---|---|---|
| 3,521,144 A | 7/1970 | Martin | |
| 10,718,880 B2* | 7/2020 | Simon | ............... G01V 5/08 |
| 2012/0274328 A1 | 11/2012 | Hanington et al. | |
| 2013/0208841 A1 | 8/2013 | Perkins et al. | |
| 2015/0181688 A1 | 6/2015 | Perkins | |
| 2016/0020058 A1* | 1/2016 | Hadland | ............... H05G 1/12 |
| | | | 378/111 |
| 2016/0308434 A1 | 10/2016 | Warmack et al. | |
| 2020/0174155 A1 | 6/2020 | Simon et al. | |

FOREIGN PATENT DOCUMENTS

DE            976500 C    * 10/1963    ............ H02M 7/106

* cited by examiner

*Primary Examiner* — Marcus H Taningco
(74) *Attorney, Agent, or Firm* — Trevor G. Grove (57) ABSTRACT

A downhole tool may include a voltage multiplier within a housing. The voltage multiplier may transform input power to the downhole tool from a first voltage to a second voltage higher than the first. The downhole tool may also include multiple shielding rings surrounding at least the voltage multiplier to reduce electric field stresses within the downhole tool. Additionally, the downhole tool may include an insulator located between the shielding rings and the housing.

20 Claims, 7 Drawing Sheets

HIGH-VOLTAGE PROTECTION AND SHIELDING WITHIN DOWNHOLE TOOLS

CROSS-REFERENCE TO RELATED APPLICATIONS

This application is a continuation of U.S. patent application Ser. No. 16/203,867 filed Nov. 29, 2018, which is incorporated by reference herein.

BACKGROUND

This disclosure relates generally to systems and methods for high-voltage power supply and nuclear or photonic radiation generator electrical protection and shielding for use in downhole tools.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a wellbore drilled into a geological formation is a remarkably complex endeavor. In many cases, decisions involved in hydrocarbon exploration and production may be informed by measurements from downhole well-logging tools that are conveyed into the wellbore. The tools may be used to infer properties and characteristics of the geological formation surrounding the wellbore and, thus, make informed decisions. Some such tools may include a radiation generator, to irradiate the wellbore with nuclear radiation, and sensors to make inferences from the wellbore's response to the radiation.

Generally, an electrically operated radiation generator, such as an x-ray generator, a gamma ray generator, or a neutron generator, may generate radiation using electrical power to facilitate determining characteristics of the surrounding environment (e.g., the formation). Thus, radiation generators may be used in various contexts, such as a downhole tool or for material analysis. To achieve the high energy radiation, a high-voltage power supply may be implemented. Given the size limitations on downhole tools, the high-voltage power supply and radiation generator may be packaged in a relatively small housing. However, placing high-voltage components, such as high-voltage multiplier ladder components in close proximity to each other and/or to relative ground may lead to high electric field stresses and/or electrical complications. Protecting and shielding against such electrical events may increase the effectiveness, reliability, and/or longevity of the high-voltage power supply, the radiation generator, and/or the downhole tool.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

An electrically operated downhole tool, such as a nuclear radiation generator, may generate radiation (e.g., x-rays, gamma rays, neutrons, etc.) using electrical power to facilitate determining characteristics of its surrounding environment. To achieve the high energy radiation, a high-voltage power supply such as a voltage multiplier (e.g., a Cockcroft-Walton high-voltage ladder or other suitable voltage multiplier) may be implemented. However, in the confines of a downhole tool, the electrical components, operably held at high potential (e.g., greater than 100 kilovolts (kV)), may generate high electric fields between the electrical components and relative ground. To combat the electric fields and reduce or eliminate electrical events such as arcing, tracking, field emission, and/or corona effects, electrical protection and shielding may be implemented around the high-voltage components of the downhole tool.

In one embodiment, a downhole tool may include a voltage multiplier within a housing. The voltage multiplier may transform input power to the downhole tool from a first voltage to a second voltage higher than the first. The downhole tool may also include multiple shielding rings surrounding at least the voltage multiplier to reduce electric field stresses within the downhole tool. Additionally, the downhole tool may include an insulator located between the shielding rings and the housing.

In another embodiment, a method may include surrounding, at least partially, a high-voltage power supply of a downhole tool with multiple shielding rings of an annular shape to reduce electric field stresses within the diameter of the shielding rings. The method may also include electrically coupling spark gap electrodes to at least two of the shielding rings. The spark gap electrodes may propagate an electric arc to ground. The method may also include wrapping the shielding rings with an insulator and sealing an insulating gas within the housing of the downhole tool.

In another embodiment, a downhole tool system may include a nuclear radiation generator to emit nuclear radiation and a high-voltage power supply to transform an input power from a first voltage to a second voltage and supply the second voltage to the nuclear radiation generator. The downhole tool system may also include a first set of co-axial shielding rings electrically connected to multiplier stages of the high-voltage power supply and a second set of co-axial shielding rings electrically connected to generator stages of the nuclear radiation generator. The generator stages may create electric fields within the nuclear radiation generator to accelerate a charged particle into to target to generate the nuclear radiation. The downhole tool system may also include spark gaps between adjacent pairs of the first set of shielding rings to propagate an electric arc in response to a voltage differential greater than a threshold between at least one adjacent pairs of shielding rings. The downhole tool system may also include a plastic insulator surrounding the first set of co-axial shielding rings, the second set of shielding rings, or both.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, the features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The oil and gas industry includes a number of sub-industries, such as exploration, drilling, logging, extraction, transportation, refinement, retail, and so forth. During exploration and drilling, wellbores may be drilled into the ground for reasons that may include discovery, observation, or extraction of resources. These resources may include oil, gas, water, or any other combination of elements within the ground.

Wellbores, sometimes called boreholes, may be straight or curved holes drilled into the ground from which resources may be discovered, observed, or extracted. During and/or after the formation of a wellbore, well logging may be practiced. Well logging may include making a detailed record of the geological formations penetrated by a wellbore, and is generally part of the discovery and observation of resources.

The exploration of what lies beneath the ground may be accomplished by a number of methods including surface and downhole techniques. The discovery and observation of resources using downhole techniques generally takes place down in the wellbore with downhole tools. These downhole tools may be a part of a tool-string that may be attached to a drill or other downhole device.

One particular type of downhole may include an electrically operated radiation generator for generating nuclear radiation (e.g., neutrons, gamma rays, x-rays, etc.) to facilitate determining characteristics (e.g., porosity and/or mineralogy) of the formation. As used herein, nuclear radiation shall include radiation of nuclear particles and/or photonic particles. Depending on the desired characteristics to be determined, various types of electrically operated radiation generators may be used, such as x-ray generators, gamma ray generators, or neutron generators. For example, in a downhole tool, a radiation generator may facilitate determining the porosity of surrounding formations, based at least in part on counts (e.g., number of neutrons or gamma-rays) of radiation, and/or determining the mineralogy of surrounding formations, based at least in part on a spectrum of radiation measured by a detector (e.g., scintillator).

Nevertheless, the different types of electrically operated radiation generators may use high-voltage power supplies to facilitate the generation of the nuclear radiation. For example, high-voltages may be used to produce electric fields to accelerate a particle (e.g., ion or electron) toward a target. When the particle strikes atoms of the target, radiation may be generated and output from the downhole tool. The radiation may then interact with atoms in the surrounding environment (e.g., the formation) and a response detected.

The high-voltage power supply may include, for example a Cockcroft-Walton high-voltage ladder or other suitable multiplier ladder to generate such high-voltages (e.g., greater than 50 kilovolts (kV), greater than 100 kV, or greater than 400 kV). However, in the confines of a downhole tool, high electric field stresses may occur between the electrical components and relative ground. Furthermore, small (e.g., less than 8 inches in diameter, less than 5 inches in diameter, or less than 3 inches in diameter) downhole tools may be more susceptible to adverse electrical effects due to the close proximity of the electrical components and/or their proximity to relative ground. As such, shielding rings and/or an insulating material may be implemented around the electrical components of the high-voltage power supply and/or the radiation generator to reduce or eliminate arcing, tracking, field emission, and/or corona effects within the downhole tool.

The shielding rings may help reduce the electric field stresses around the electrical components of the downhole tool by, for example, minimizing changes to the electric field within the circumference of the shielding rings. In some embodiments, spark gaps may also be implemented between adjacent shielding rings to direct electrical discharges away from the electrical components of the downhole tool. Additionally or alternatively, in some embodiments, the shielding rings may be potted in a non-conductive or slightly conductive (e.g., having a conductivity of greater than $10^{-16}$ Siemens per meter (S/m)) material to further reduce electrical field stresses. Moreover, in some embodiments, an insulator (e.g., a plastic insulator) may be implemented surrounding the shielding rings to further insulate the high-voltages from the relative ground, for example, of the housing of the downhole tool. As should be appreciated, the embodiments described herein, although illustrated in the context of a downhole tool with a radiation generator, may be implemented for electrical protection and shielding in any suitable downhole tool employing high-voltage components.

Figure 1:
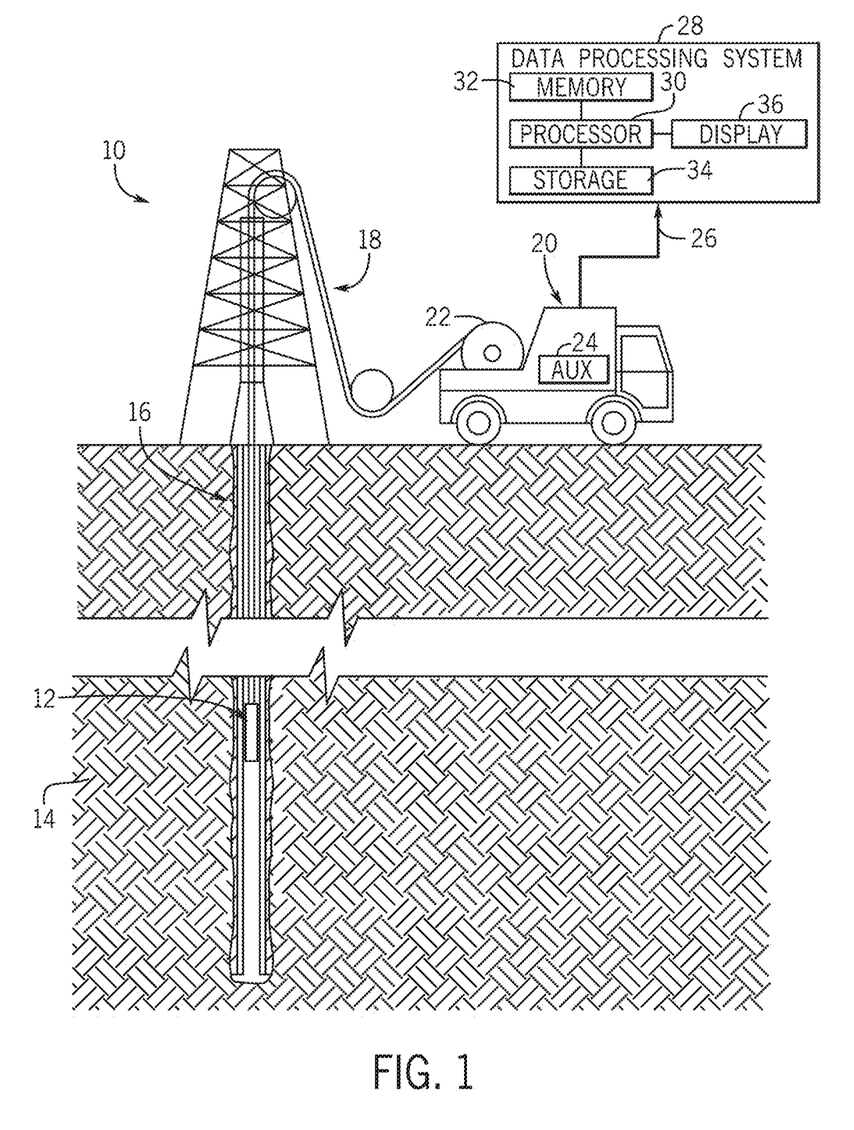
FIG. 1 is an example of a downhole tool system, in accordance with an embodiment.

With the foregoing in mind, FIG. 1 illustrates a well-logging system 10 that may employ the systems and methods of this disclosure. The well-logging system 10 may be used to convey a downhole tool 12 through a geological formation 14 via a wellbore 16. In the example of FIG. 1, the downhole tool 12 is conveyed on a cable 18 via a logging winch system (e.g., vehicle) 20. Although the logging winch system 20 is schematically shown in FIG. 1 as a mobile logging winch system carried by a truck, the logging winch system 20 may be substantially fixed (e.g., a long-term installation that is substantially permanent or modular). Any suitable cable 18 for well logging may be used. The cable 18 may be spooled and unspooled on a drum 22 and an auxiliary power source 24 may provide energy to the logging winch system 20 and/or the downhole tool 12.

Moreover, while the downhole tool 12 is described as a wireline downhole tool, it should be appreciated that any suitable conveyance may be used. For example, the downhole tool 12 may instead be conveyed as a logging-while-drilling (LWD) tool as part of a bottom-hole assembly (BHA) of a drill string, conveyed on a slickline or via coiled tubing, and so forth. For the purposes of this disclosure, the downhole tool 12 may be any suitable downhole tool 12 using a high-voltage power supply, for example, to generate nuclear radiation within the wellbore 16 (e.g., downhole environment). As discussed further below, the downhole tool 12 may receive energy, for example, from the auxiliary power source 24 or other store/source of sufficient electrical energy and transform the voltage for use in producing nuclear radiation. Further, the supplied energy may be transformed to higher voltages within the wellbore 16, for example, via a high-voltage power supply within or proximate the downhole tool 12.

Control signals 26 may be transmitted from a data processing system 28 to the downhole tool 12, and data signals 26 related to the response of the formation 14 may be returned to the data processing system 28 from the downhole tool 12. The data processing system 28 may be any electronic data processing system 28 that can be used to carry out the systems and methods of this disclosure. For example, the data processing system 28 may include a processor 30, which may execute instructions stored in memory 32 and/or storage 34. As such, the memory 32 and/or the storage 34 of the data processing system 28 may be any suitable article of manufacture that can store the instructions. The memory 32 and/or the storage 34 may be read-only memory (ROM), random-access memory (RAM), flash memory, an optical storage medium, or a hard disk drive, to name a few examples. A display 36, which may be any suitable electronic display, may display images generated by the processor 30. The data processing system 28 may be a local component of the logging winch system 20 (e.g., within the downhole tool 12), a remote device that analyzes data from other logging winch systems 20, a device located proximate to the drilling operation, or any combination thereof. In some embodiments, the data processing system 28 may be a mobile computing device (e.g., tablet, smart phone, or laptop) or a server remote from the logging winch system 20.

Figure 2:
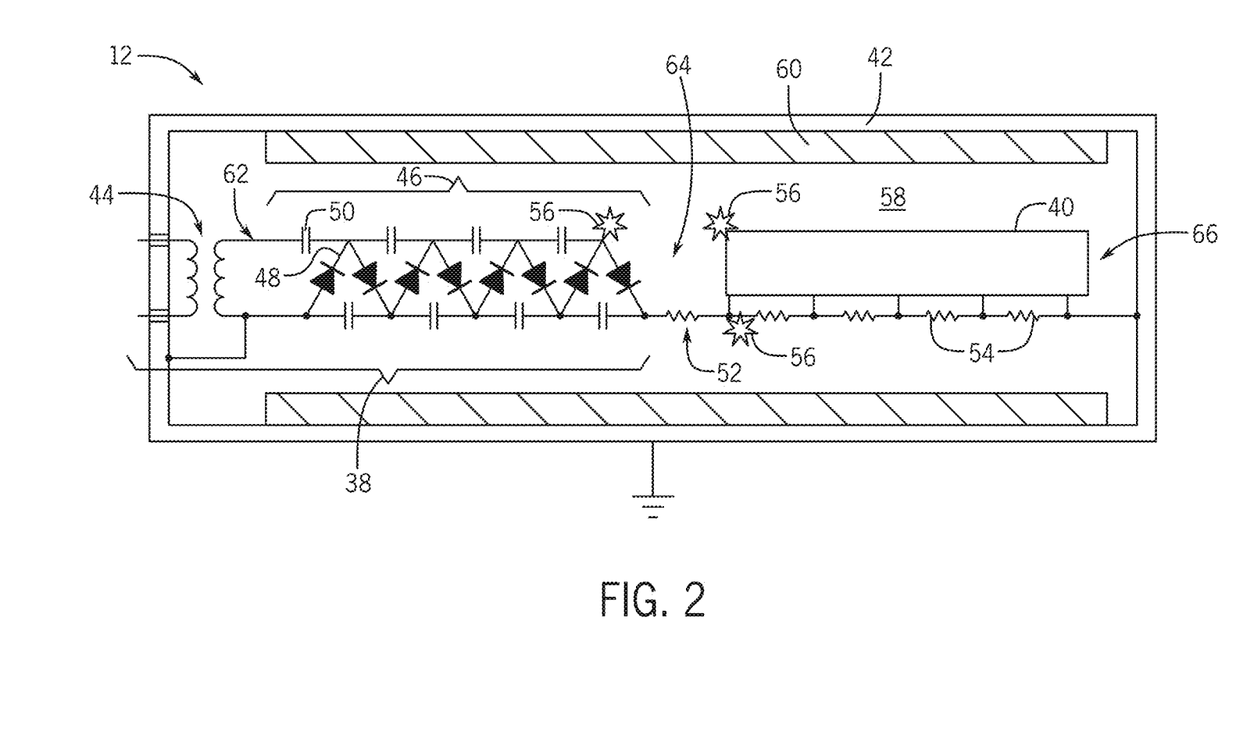
FIG. 2 is a cross-sectional view of an example downhole tool for generating nuclear radiation including an electrical insulator, in accordance with an embodiment.

As discussed above, the downhole tool 12 may include a high-voltage power supply 38 and a radiation generator 40 contained within a housing 42, as illustrated in FIG. 2. Although shown within the same housing 42, in some embodiments, the radiation generator 40 and high-voltage power supply 38 may be implemented in separate housings 42. The high-voltage power supply 38 may include, for example, an input transformer 44 and a voltage multiplier 46. In some embodiments, the voltage multiplier 46 may include diodes 48 and/or capacitors 50 arranged in a unipolar or bipolar ladder to generate a high voltage (e.g., greater than 50 kV, greater than 100 kV, or greater than 400 kV) to be output, for example, to the radiation generator 40. The voltage multiplier 46 may include, for example, a Cockcroft-Walton voltage multiplier ladder, a derivation thereof, or any suitable electrical circuitry for generating high-voltage within the confines of the downhole tool 12. In some embodiments, a surge resistor 52 may be used between the high-voltage power supply 38 and the radiation generator 40 to reduce or eliminate the effects of power surges, for example, due to arcing.

The radiation generator 40 may use the high-voltage power generated by the high-voltage power supply 38 to generate neutrons, gamma rays, x-rays, or other nuclear radiation. In some embodiments, biasing resistors 54 may step the generated high-voltage down over the length of the radiation generator 40 to create a graduated electric field in which charged particles (e.g., electrons, ions, etc.) are accelerated. In one embodiment, the radiation generator 40 may accelerate particles into a target to generate the nuclear radiation. To create the potential difference, and thus electric fields in the radiation generator 40, a reference voltage (e.g., relative ground) may be introduced, for example, via the housing 42. Maintaining the housing 42 at relative ground may also reduce electrical interference and/or discharge through the housing 42 to the environment. However, due to the high-voltage components (e.g., diodes 48, capacitors 50, resistors (e.g., the surge resistor 52, the biasing resistors 54, or other resistors), and/or the wires, solder joints, and leads thereto) used in such close proximity (e.g., less than three inches) to each other and the housing 42 at relative ground, the electric field stresses may cause electrical events 56 (e.g., arcing, insulation breakdown, surface tracking, corona events, field emission, etc.).

Figure 3:
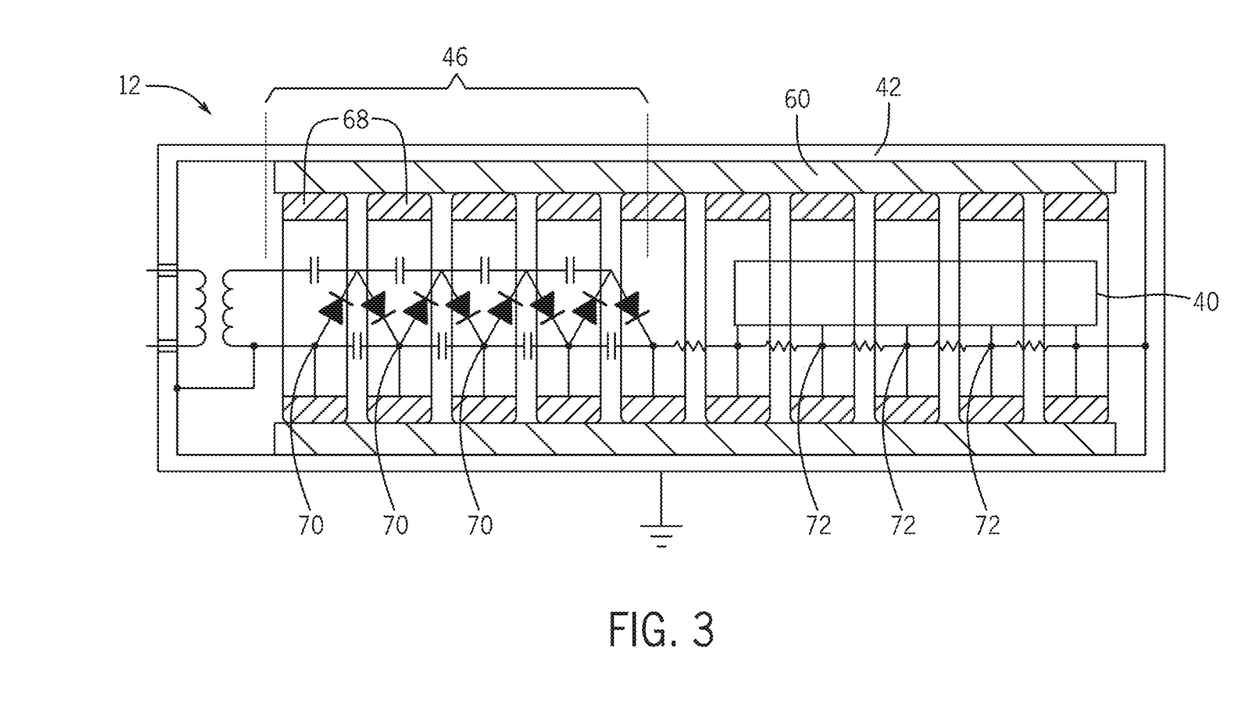
FIG. 3 is a cross-sectional view of an example downhole tool for generating nuclear radiation including shielding rings and an insulator, in accordance with an embodiment.

In some embodiments, an insulating gas 58 (e.g., air, sulfur hexafluoride (SF6), etc.) or vacuum, may be hermetically sealed within the downhole tool 12 to assist in the prevention of the electrical events 56. Additionally or alternatively, an insulator 60 of high dielectric strength (e.g., perfluoroalkoxy (PFA), fluorinated ethylene propylene (FEP), and/or plastic, Kapton, or Teflon materials) may be used along the inner edge of the housing 42. In some embodiments, the insulator 60 may extend at least from the beginning 62 of the voltage multiplier 46 to an end 64 of the voltage multiplier 46. Moreover, the insulator 60 may also extend to an end 66 of the radiation generator 40. The insulator 60 may be affixed to the housing 42 of the downhole tool 12 and/or affixed to the internal components (e.g., high-voltage power supply 38, radiation generator 40, other electrical shielding, etc.) of the downhole tool 12. In some embodiments, the insulator 60 may be implemented as a film wound around shielding rings 68 surrounding the internal components, as shown in FIG. 3.

Shielding rings 68 may be implemented in a co-axial arrangement around the voltage multiplier 46 and/or the radiation generator 40 to reduce the electric field stresses proximate the electrical components of the downhole tool 12. In one embodiment, the shielding rings 68 may be generally conductive and made of any suitable metallic material or other conductor. Further, in one embodiment, the shielding rings 68 may be made of a semiconductor plastic. Multiplier stages 70 of the voltage multiplier 46 and/or generator stages 72 of the radiation generator 40 may be electrically connected to individual shielding rings 68. As such, adjacent shielding rings 68 may be held at different potentials. By electrically connecting the individual shielding rings 68 to the electrical components radially adjacent to them, the shielding rings 68 may be held at the same or approximate (e.g., within 20 kV or within 40 kV) potential as the adjacent electrical components. By maintaining the shielding rings 68 at approximately the same potential as the electrical components within the circumference of the shielding rings 68, the electric fields and corresponding electric field stresses within the shielding rings 68 may be reduced. Moreover, the reduced electric fields may result in reduced electrical events 56.

In some embodiments, magnetic coupling from within the circumference of the shielding rings 68 to outside the shielding rings 68 may be desired. For example, an isolation transformer may be implemented as part of the electrical circuitry of the downhole tool 12 or the input transformer 44 may be partially enclosed within the shielding rings 68. As such, in one embodiment, the shielding rings 68 may form a partial ring, for example having an arc angle greater than 180 degrees and less than 360 degrees, to increase magnetic coupling from within the shielding rings 68 to outside the shielding rings 68 while still minimizing the electric field stresses within the shielding rings 68.

Figure 4A:
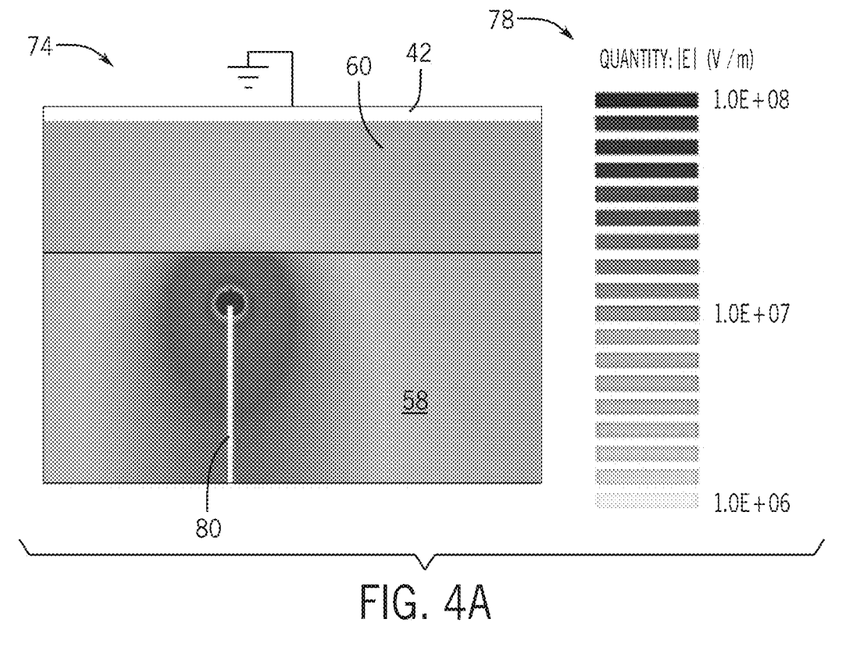
FIG. 4A is a plot of an electrical field without the use of shielding rings, in accordance with an embodiment.
Figure 4B:
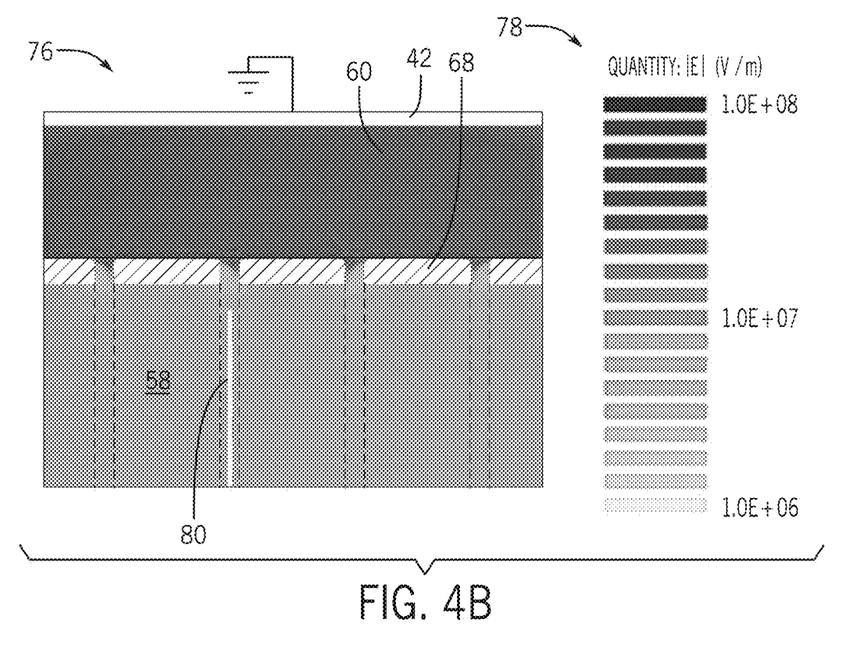
FIG. 4B is a plot of an electrical field with the use of shielding rings, in accordance with an embodiment.

To help illustrate the effect of the shielding rings 68, FIGS. 4A and 4B are plots 74, 76 of the electric field 78 around a sharp point 80 without and with the use of shielding rings 68, respectively. The sharp point 80 may represent, for illustrative purposes, a component of the downhole tool 12 at high voltage such as a wire end, a corner of the radiation generator 40, or a solder joint. In general, sharp points 80 induce increased electric field stresses over smooth surfaces and may be used to illustrate effects on electric fields 78. As such, electrical events 56 may be more likely at sharp points 80 and/or edges. For the purpose of illustration, the sharp point 80 in the plot 74 of FIG. 4A is held at 400 kV and induces a large electric field 78 (e.g., greater than 100 megavolts per meter (MV/m)). When the shielding rings 68 are implemented, as depicted in the plot 76 of FIG. 4B, the electric field 78 around the sharp point 80 is reduced. The reduction in the electric field 78 within the shielding rings 68 may assist in protecting the electrical components from electrical events 56 such as corona events and/or surface tracking, which may, in turn, increase the efficiency and/or longevity of the downhole tool 12. As will be appreciated, the plots 74, 76 are given for illustration purposes, and other electric fields 78 and/or voltages may occur depending on implementation.

In one embodiment, the shielding rings 68 may be implemented around the voltage multiplier 46 and the radiation generator 40. By reducing the electric field around the radiation generator 40, electrical events 56, as discussed above, may be reduced on the radiation generator 40. Additionally, the intentional electric fields of the radiation generator 40, for example, for accelerating charged particles, may be shielded from interference. As such variability in radiation generation between separate downhole tools 12 may be reduced.

Figure 5:
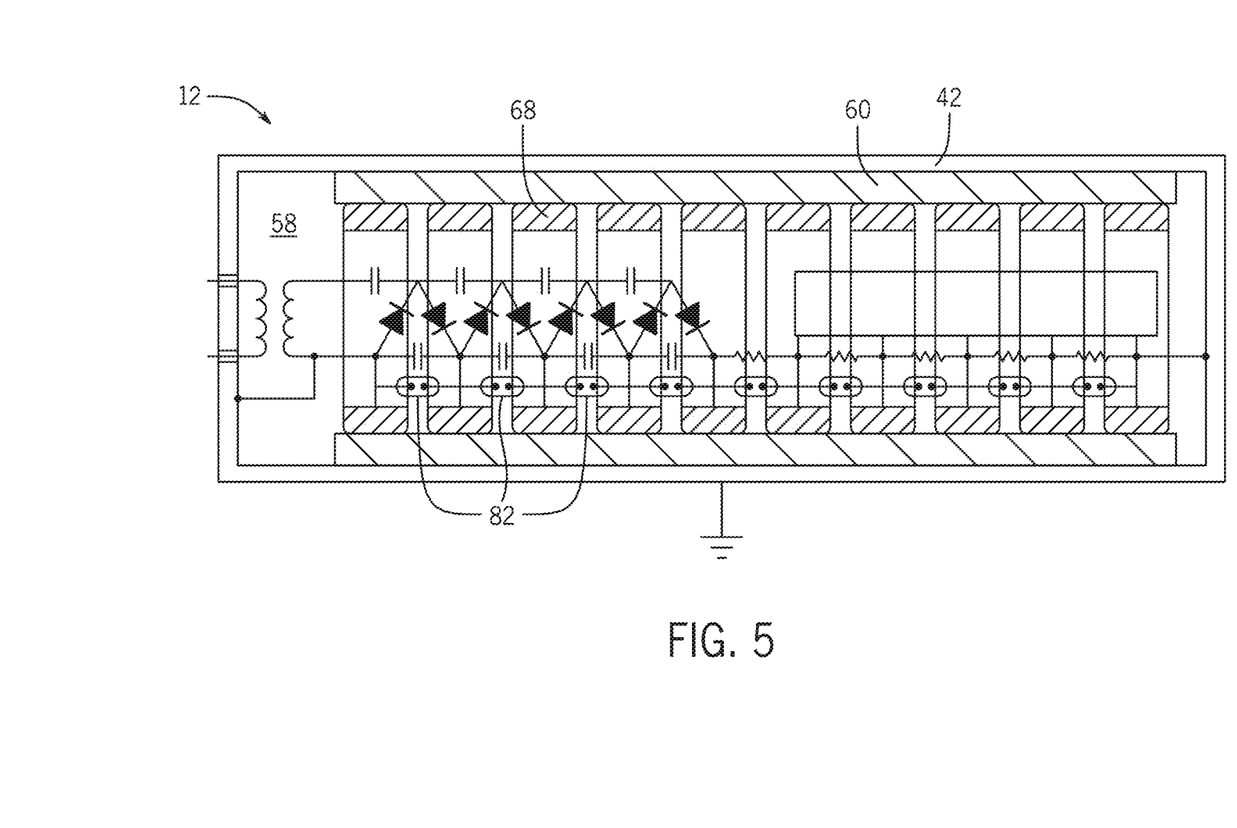
FIG. 5 is a cross-sectional view of an example downhole tool for generating nuclear radiation including shielding rings, an insulator, and spark gaps, in accordance with an embodiment.

FIG. 5 is a cross-sectional view of an example downhole tool 12 implementing the shielding rings 68, the insulator 60, an insulating gas 58, and one or more spark gaps 82 between adjacent shielding rings 68. The spark gaps 82 may assist in protecting the electrical components of the downhole tool 12 in case of an electrical event 56 (e.g., arcing) occurrence. To prevent arcing within the electrical components, the spark gaps 82 may become a short to relative ground (e.g., the housing 42) when the voltage difference exceeds a given threshold. For example, if the voltage difference exceeded the threshold, for instance between two shielding rings 68, the arc may propagate to relative ground via a series of electrodes, between which spark gaps 82 are formed, instead of shorting through the electrical components. In combination, the shielding rings 68 and the spark gaps 82 assist in protecting the high-voltage components from corona events, arcing, and/or current leakage, while also increasing the reliability and/or longevity of the downhole tool 12, while also allowing for a small form factor.

Figure 6A:
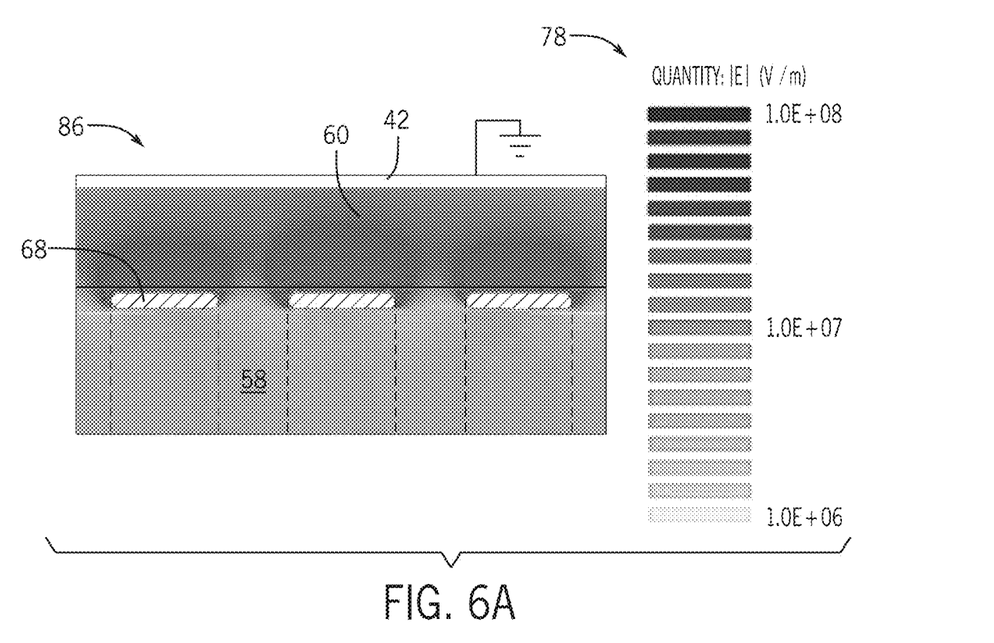
FIG. 6A is a plot of an electric field without potting material, in accordance with an embodiment.
Figure 6B:
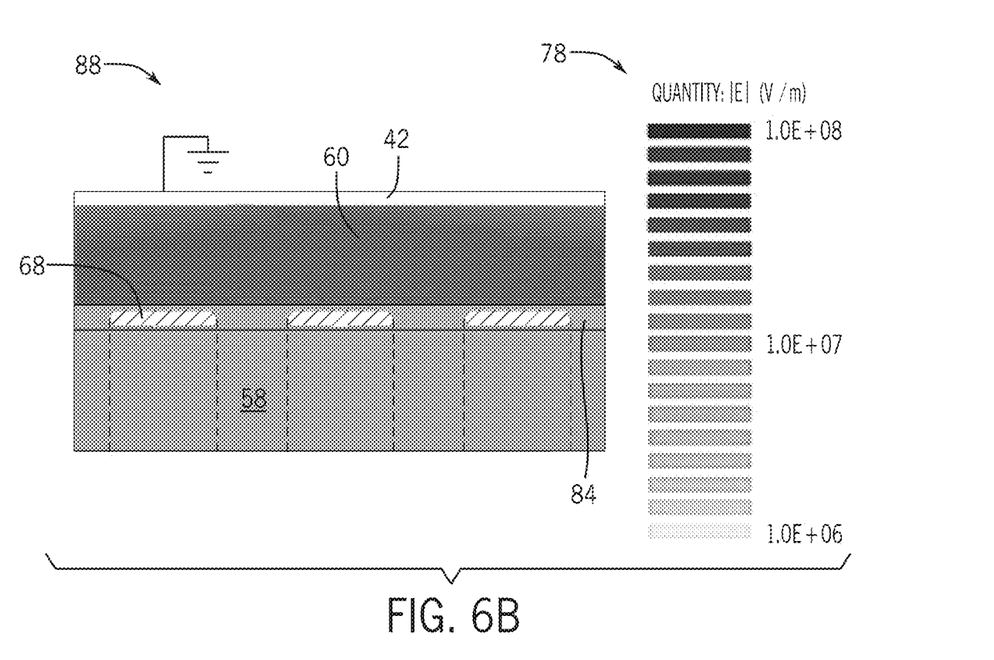
FIG. 6B is a plot of an electric field with potting material, in accordance with an embodiment.

In some embodiments, the shielding rings 68 may be potted (e.g., surrounded and/or encased) in a non-conductive or slightly conductive material to further reduce electrical field stresses as depicted in FIG. 6B. For example, the potting material 84 may have a conductivity greater than $10^{-16}$ S/m and/or a conductivity less than $10^{-4}$ S/m, less than $10^{-8}$ S/m, or less than $10^{-13}$ S/m. Furthermore, in some embodiments, the potting material 84 may be more conductive than the insulator 60 and/or the shielding rings 68. Moreover, the potting material 84 may have a conductivity between that of the insulator 60 and the shielding rings 68. In one embodiment, a potting material 84 such as boron nitride with a silicon elastomer (e.g., Sylgard) may be implemented on the surface of the shielding rings 68, between adjacent shielding rings 68, and/or between the shielding rings 68 and the insulator 60. As such, the potting material 84 may form a cylindrical tube on the outer edge of the shielding rings 68 and, in some embodiments, encasing the shielding rings 68. To help illustrate the effect of the potting material 84, FIGS. 6A and 6B are plots 86, 88 of the shielding rings 68 and insulator 60 without and with the potting material 84, respectively. As illustrated in the plot 88 of FIG. 6B, the electric field 78 around shielding rings 68 potted with the potting material 84 is reduced compared to the plot 86 of FIG. 6A without the potting material 84. The reduction in electric field stresses on the exterior of the shielding rings 68 may further reduce the likelihood of electrical events 56 such as arcing. As will be appreciated, the plots 86, 88 are given for illustration purposes, and other electric fields 78 may occur depending on implementation.

Figure 7:
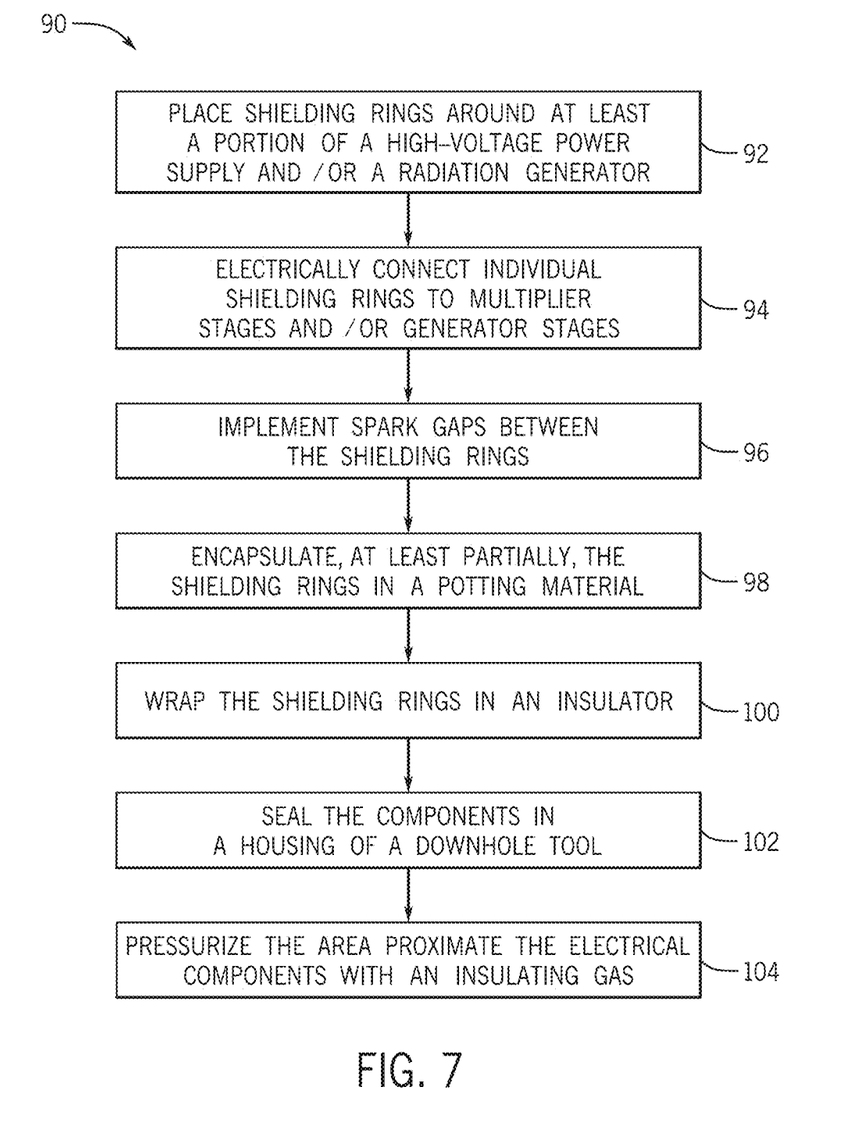
FIG. 7 is a flowchart for implementing electrical shielding within a downhole tool, in accordance with an embodiment.

FIG. 7 is a flowchart 90 of an example process for implementing the electrical protection and shielding discussed above within a downhole tool 12. In one embodiment, shielding rings 68 may be placed around a high-voltage power supply 38, or a portion thereof (e.g., the voltage multiplier 46), and/or a radiation generator 40 (process block 92). The individual shielding rings 68 may also be electrically connected to multiplier stages 70, of the voltage multiplier 46, and/or generator stages 72, of the radiation generator 40 (process block 94). Spark gaps 82 may be implemented between the shielding rings 68 (process block 96). The shielding rings 68 may also be encapsulated, at least partially, in a potting material 84 (process block 98). The shielding rings 68, implemented with or without the potting, may be wrapped in an insulator 60

(process block 100), for example, via multiple layers of insulating film. Further, the components of the downhole tool 12 may be sealed in a housing 42 (process block 102). Additionally, the area proximate the electrical components may be pressurized with an insulating gas 58 (process block 104). Although the above referenced flowchart 90 is shown in a given order, in certain embodiments, the depicted steps may be reordered, altered, deleted, and/or occur simultaneously. Additionally, the referenced flowchart 90 is given as an illustrative tool, and further decision and/or process blocks may be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A downhole tool comprising:
a housing;
a voltage multiplier within the housing and configured to transform input power to the downhole tool from a first voltage to a second voltage, wherein the second voltage is greater than the first voltage;
a set of shielding rings surrounding at least the voltage multiplier and configured to reduce electric field stresses within the downhole tool; and
an insulator located between the set of shielding rings and the housing.

2. The downhole tool of claim 1, wherein the voltage multiplier comprises a plurality of multiplier stages, wherein the set of shielding rings surrounds the plurality of multiplier stages.

3. The downhole tool of claim 1, wherein at least one shielding ring of the set of shielding rings comprises a metallic conductive material.

4. The downhole tool of claim 1, wherein at least one shielding ring of the set of shielding rings comprises a semiconductor material.

5. The downhole tool of claim 1, wherein the insulator comprises perfluoroalkoxy (PFA) film wrapped around an exterior circumference of the set of shielding rings.

6. The downhole tool of claim 1, wherein the housing is maintained at a relative ground potential.

7. The downhole tool of claim 1, wherein the housing is sealed, and wherein an interior of the housing comprises compressed sulfur hexafluoride (SF6) gas proximate the voltage multiplier.

8. The downhole tool of claim 1, wherein at least one shielding ring of the set of shielding rings comprises at least one partial ring comprising an arc angle greater than 180 degrees and less than 360 degrees, wherein the at least one partial ring facilitates magnetic coupling from within the at least one partial ring to outside the at least one partial ring.

9. The downhole tool of claim 1, wherein the set of shielding rings comprises a plurality of shielding rings, and wherein spark gaps are located between at least two shielding rings of the plurality of shielding rings.

10. The downhole tool of claim 1, wherein the set of shielding rings are potted in a potting material, wherein the potting material comprises boron nitride.

11. The downhole tool of claim 1, comprising a radiation generator configured to emit nuclear radiation, wherein at least one shielding ring of the set of shielding rings surrounds at least the radiation generator.

12. The downhole tool of claim 11, wherein the radiation generator comprises a plurality of generator stages, wherein the set of shielding rings is electrically coupled to a single generator stage of the plurality of generator stages.

13. A method comprising:
surrounding, at least partially, a high-voltage power supply of a downhole tool with a set of shielding rings, wherein each shielding ring of the set of shielding rings comprises an annular shape, and wherein each shielding ring of the set of shielding rings is configured to reduce electric field stresses within a diameter of the respective shielding ring;
wrapping the set of shielding rings with an insulator; and
sealing an insulating gas within a housing of the downhole tool.

14. The method of claim 13, wherein the set of shielding rings comprises a plurality of shielding rings, and wherein each of the plurality of shielding rings are electrically coupled to different electrical components of the high-voltage power supply at different potentials.

15. The method of claim 14, comprising potting the plurality of shielding rings in a material comprising a first conductivity, wherein the first conductivity is greater than a second conductivity of the insulator.

16. The method of claim 15, wherein wrapping the plurality of shielding rings with the insulator comprises wrapping the potted plurality of shielding rings in a plurality of layers of plastic film.

17. The method of claim 16, comprising:
surrounding, at least partially, a nuclear radiation generator of the downhole tool with the plurality of shielding rings; and
electrically coupling each of the plurality of shielding rings surrounding the nuclear radiation generator to stages of the nuclear radiation generator held at different potentials, wherein the plurality of shielding rings are configured to reduce electric field interference to the nuclear radiation generator within the diameter of the plurality of shielding rings surrounding the nuclear radiation generator.

18. A downhole tool system comprising:
a nuclear radiation generator configured to emit nuclear radiation;
a high-voltage power supply configured transform an input power from a first voltage to a second voltage and supply the second voltage to the nuclear radiation generator;
a first set of co-axial shielding rings electrically coupled to multiplier stages of the high-voltage power supply;
a second set of co-axial shielding rings electrically coupled to generator stages of the nuclear radiation generator, wherein the generator stages are configured to create electric fields within the nuclear radiation generator to accelerate a charged particle into to target to generate the nuclear radiation;
a plurality of spark gaps between adjacent pairs of shielding rings of the first set of co-axial shielding rings, wherein the spark gaps are configured to propagate an electric arc in response to a voltage differential greater than a threshold between at least one pair of the adjacent pairs of shielding rings; and
a plastic insulator surrounding the first set of co-axial shielding rings, the second set of co-axial shielding rings, or both.

19. The downhole tool system of claim 18, comprising a potting material located radially between the plastic insulator and the first set of co-axial shielding rings.

20. The downhole tool system of claim 19, wherein the potting material comprises a cylindrical tube of boron nitride with a silicon elastomer encasing the first set of co-axial shielding rings.

\* \* \* \* \*